United States Patent
Komiya et al.

(10) Patent No.: US 7,214,431 B2
(45) Date of Patent: May 8, 2007

(54) TWO-LAYER FILM FORMED OF RADIATION CURED RESIN COMPOSITIONS AND METHODS OF MAKING THE SAME

(75) Inventors: Zen Komiya, Umezono (JP); Takashi Ukachi, Ibaraki (JP)

(73) Assignee: DSM IP Assets B.V., Te Heerlen (NL)

( * ) Notice: Subject to any disclaimer, the term of this patent is extended or adjusted under 35 U.S.C. 154(b) by 0 days.

(21) Appl. No.: 10/240,559

(22) PCT Filed: Apr. 3, 2001

(86) PCT No.: PCT/NL01/00277

§ 371 (c)(1),
(2), (4) Date: May 14, 2003

(87) PCT Pub. No.: WO01/74732

PCT Pub. Date: Oct. 11, 2001

(65) Prior Publication Data

US 2003/0176522 A1 Sep. 18, 2003

(30) Foreign Application Priority Data

Apr. 3, 2000 (JP) .............................. 2000-100484

(51) Int. Cl.
| | |
|---|---|
| *B32B 9/04* | (2006.01) |
| *B32B 9/00* | (2006.01) |
| *B32B 17/10* | (2006.01) |
| *B05D 5/00* | (2006.01) |
| *G02B 6/00* | (2006.01) |

(52) U.S. Cl. .................. 428/411.1; 428/426; 428/441; 428/423.1; 428/423.3; 428/412; 427/508; 427/514; 427/516; 427/517; 427/520; 427/513; 427/162; 427/163.1; 427/163.2; 522/71; 522/39; 522/50; 522/63; 522/65; 522/90; 522/96; 522/182; 385/147

(58) Field of Classification Search .................. 522/39, 522/50, 63, 65, 90, 96, 182, 71; 428/411.1, 428/426, 412, 422.8, 423.1, 343, 345, 355, 428/355 N, 423.3, 441; 427/508, 514, 516, 427/517, 520, 207.1, 208, 208.8, 162, 163.1, 427/163.2; 385/147

See application file for complete search history.

(56) References Cited

U.S. PATENT DOCUMENTS

| | | | | |
|---|---|---|---|---|
| 5,093,386 | A | * 3/1992 | Bishop et al. | ................. 522/96 |
| 6,136,880 | A | * 10/2000 | Snowwhite et al. | .......... 522/64 |
| 6,326,414 | B1 * | 12/2001 | Iida | ............................ 522/16 |
| 6,359,025 | B1 * | 3/2002 | Snowwhite et al. | .......... 522/64 |
| 6,438,306 | B1 * | 8/2002 | Bishop et al. | ............... 385/128 |
| 2003/0100627 | A1 * | 5/2003 | Bishop et al. | .............. 522/153 |

FOREIGN PATENT DOCUMENTS

WO 98 070210 12/1998

OTHER PUBLICATIONS

ASTM Standard search—search results from http://www.astm.org. Aug. 20, 2004 1 page.*
Chemical Abstracts, Vo. 104, No. 20, May 19, 1986, Abstract No. 173124 for "Resin Compositions for Coating Optical Fibers", p. 286.
Chemical Abstracts Vo. 109, No. 10, Sep. 5, 1988, Abstract No. 78490, for "Glass Optical Fibers Coated With Ultraviolet-Curable Resins", p. 322.

* cited by examiner

*Primary Examiner*—Sanza L. McClendon
(74) *Attorney, Agent, or Firm*—Nixon & Vanderhye, P.C.

(57) ABSTRACT

The invention relates to a liquid curable resin composition capable of forming a ribbon matrix material which can be completely removed from a coloring layer when separating the optical fiber ribbon. A liquid curable resin composition comprising: (1) 30–80 wt. % of a urethane (meth)acrylate produced by reacting (A) a polyol compound, (B) a polyisocyanate compound, and (C) a (meth)acrylate compound containing a hydroxyl group, (2) 0.01–10 wt % of 2-methly-1-[4-(methylthio)phenyl]-2-morpholino-propan-1-one, and (3) 10–70 wt. % of a polymerizable diluent comprising a polymerizable monofunctional vinyl monomer which is copolymerizable with the component (1), wherein a two-layer film, which is obtained by applying the composition to a cured film of a UV-curable resin comprising the compound shown by the above formula (1) and curing the composition, has a T-peel strength of about 1.8 g/cm or less.

10 Claims, No Drawings

TWO-LAYER FILM FORMED OF RADIATION CURED RESIN COMPOSITIONS AND METHODS OF MAKING THE SAME

CROSS REFERENCE TO RELATED APPLICATION

This application is the National Phase of International Application PCT/NL01/00277 filed Apr. 3, 2001 which designated the U.S. and is hereby incorporated in its entirety by reference.

The present invention relates to a liquid curable resin composition exhibiting excellent liquid storage stability that produces a cured product with low adhesion to substrates, and to a two-layer film using the composition. More particularly, the present invention relates to a liquid curable resin composition suitable as a coating material for optical fiber ribbon and a two-layer film using the composition.

In the fabrication of optical fibers, a resin coating is applied for protection and reinforcement immediately after spinning molten glass fibers. As such a resin coating, a two-layer coating structure consisting of a primary flexible coating layer provided on the surface of optical fibers and a secondary rigid coating layer provided over the primary coating layer has been known. A resin composition for forming the primary coating layer is called a primary material, a resin composition for forming the secondary coating layer is called a secondary material. Optionally, said two-layer coating structure can then in turn be coated with a colored coating composition. The terms "colored coating composition", "colored layer", "radiation curable ink", "ink layer" and "ink composition" are used interchangeably throughout the specification.

An optical fiber ribbon is known in the art in the application of optical fibers provided with such a resin coating. The optical fiber ribbon is fabricated by placing several optical fibers provided with a resin coating on a plane, side by side, and securing the optical fibers with a binder to form a tape-shaped structure with a rectangular cross section. In the optical fiber ribbon, optical fibers are colored for identification of each optical fiber. A material for binding optical fibers to produce an optical fiber ribbon is called a ribbon matrix material. In addition, a material for further binding optical fiber ribbons to produce a multi-core optical fiber ribbon is called bundling material. Optionally, said optical fiber ribbons can be packaged into larger structures to form cables.

In telecommunications applications of optical fibers, multiple individual strands of coated fiber must be packaged into larger structures such as ribbons and cables to maximize efficiency. However, after ribboning and cabling of other so they can be accurately identified during, for example, installation and repair. Cable geometry and/or color coding can be used to distinguish and identify individual fibers in a complex cable. Although several methods can be used to color code fiber, color coding can be done advantageously with either a thin ink layer (<10 microns) which is placed over the coated fiber before ribboning and cabling or by using a colored secondary coating.

The tape-like optical fiber ribbons are prepared by embedding at least two individual color coded fibers in a supporting matrix material which, like the primary and secondary coatings, is also radiation-curable to maximize production speed. Optical fiber ribbons may comprise e.g., 2 to 24 colored fibers. The matrix material can encase the color coded optical glass fiber or the matrix material can edge-bond the glass fibers together. Cure of the matrix material occurs during the ribboning stage after the fibers have been color-coded by applying a colored coating. Hence, in a ribbon design, the ink layer resides between the ribbon's matrix material and the fibers' secondary coating. This means that the ink layer's interfacial characteristics (e.g., surface energy, adhesion) must be carefully controlled to function properly with both matrix material and secondary coating in the ribbon structure. In particular, the ability of a cured matrix material to be suitably stripped off the ink layer (break-out) is an important technical consideration. Ribbon break-out is generally carried out by a mechanical force, although chemical softening of the matrix with use of solvents is also known.

Desired characteristics for curable resins used as coating materials for optical fibers further include: being liquid at room temperature and having a sufficiently low viscosity for ensuring excellent applicability; having good storage stability in a liquid state and exhibiting no compositional distribution; providing good productivity due to a high curing speed; having high strength and superior flexibility; exhibiting very little physical change during wide range temperature changes; having superior resistance to heat and hydrolysis; showing superior long term reliability due to little physical change over time; showing superior resistance to chemicals such as acids and alkalis; absorbing only a small amount of moisture and water; exhibiting superior light resistance; exhibiting superior oil resistance; producing little hydrogen gas, which adversely affects optical fibers and the like.

The ribbon matrix material of the optical fiber ribbon is removed for connection at the end of the ribbon and each optical fiber is separated. At this time, the ribbon matrix material must be completely removed from the coloring layer of the optical fiber. If the ribbon matrix material adheres to the coloring layer, separation may become difficult. Moreover, the coloring layer may be removed from the secondary material layer, whereby the optical fiber cannot be identified.

Accordingly, an object of the present invention is to provide a liquid curable resin composition capable of forming a ribbon matrix material that can be completely removed from the coloring layer when separating the optical fiber ribbon.

Another object of the present invention is to provide a two-layer film comprising a cured coating layer of the liquid curable resin composition of the present invention.

Other objects and advantages of the invention will hereinafter become more readily apparent from the following description.

According to the present invention, the above objects can be achieved by a liquid curable resin composition comprising:

(1) 30–80 wt % of a urethane (meth)acrylate produced by reacting (A) a polyol compound, (B) a polyisocyanate compound, and (C) a (meth)acrylate compound containing a hydroxyl group;

(2) 0.01–10 wt % of 2-methyl-1-[4-(methylthio)phenyl]-2-morpholino-propan-1-one shown by the following formula (1);

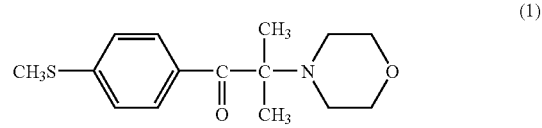

and (3) 10–70 wt % of one or more polymerizable diluents comprising a polymerizable monofunctional and/or polyfunctional vinyl monomer which is copolymerizable with the component (1) [provided that the total weight of the components (1), (2), and (3) is 100 wt %], wherein a two-layer film, which is obtained by applying the composition to a cured film of a UV-curable resin comprising the compound shown by the above formula (1) and curing the composition, has a T-peel strength of about 1.8 g/cm or less.

Preferably, the radiation curable resin composition comprises at least about 0.05 wt. % of the compound shown by formula (1), more preferably at least about 0.1 wt %, particularly preferred at least about 0.5 wt %, most preferred at least about 1 wt %. It is particularly preferred that the composition comprises about 2 wt % or more of the compound of formula (1).

The present invention will be described in more detail below.

The urethane (meth)acrylate used as the component (1) in the present invention is produced by reacting (A) a polyol compound, (B) a polyisocyanate compound, and (C) a (meth)acrylate compound containing a hydroxyl group.

As a method of reacting these compounds, a method of reacting a polyol, polyisocyanate, and (meth)acrylate containing a hydroxyl group all together; a method of reacting a polyol with a polyisocyanate, and then reacting the resulting product with a (meth)acrylate containing a hydroxyl group; a method of reacting a polyisocyanate with a (meth)acrylate containing a hydroxyl group, and then reacting the resulting product with a polyol; and a method of reacting a polyisocyanate with a (meth)acrylate containing a hydroxyl group, reacting the resulting product with a polyol, and further reacting the resulting product with a (meth)acrylate containing a hydroxyl group can be given.

Examples of the polyol used as the component (A) are a polyether diol, polyester diol, polycarbonate diol, polycaprolactone diol. These polyols may be used either individually or in combinations of two or more. There are no specific limitations to the manner of polymerization of the structural units in these polyols. Any of random polymerization, block polymerization, or graft polymerization is acceptable.

Examples of polyether diols include polyethylene glycol, polypropylene glycol, polytetramethylene glycol, polyhexamethylene glycol, polyheptamethylene glycol, polydecamethylene glycol, polyether diols obtained by the ring-opening copolymerization of two or more ion-polymerizable cyclic compounds. Examples of the above ion-polymerizable cyclic compounds include cyclic ethers such as ethylene oxide, propylene oxide, butene-1-oxide, isobutene oxide, 3,3-bis(chloromethyl)oxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidyl benzoate. As specific examples of the combinations of two or more ion-polymerizable cyclic compounds, binary copolymers of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, butene-1-oxide and ethylene oxide, ternary copolymers of tetrahydrofuran, butene-1-oxide, and ethylene oxide, tetrahydrofuran, butene-1-oxide, and ethylene oxide. A polyether diol produced by the ring-opening copolymerization of the above ion-polymerizable cyclic compounds and cyclic imines such as ethyleneimine, cyclic lactonic acids such as β-propyolactone and glycolic acid lactide, or dimethylcyclopolysiloxanes can also be used. The ring-opening copolymers of the ion-polymerizable cyclic compounds may be either a random copolymer or a block copolymer.

Examples of commercially available products of the above polyether polyols include PTMG1000, PTMG2000 (manufactured by Mitsubishi Chemical Corp.), PPG1000, EXCENOL2020, 1020 (manufactured by Asahi-Olin Ltd.), PEG1000, UNISAFE DC1100, DC1800 (manufactured by Nippon Oil and Fats Co., Ltd.), PTG1000, PTG2000, PTG3000, PPTG2000, PPTG1000, PTGL1000, PTGL2000 (manufactured by Hodogaya Chemical Co., Ltd.), Z-3001-4, Z-3001-5, PBG2000A, PBG2000B (manufactured by Daiichi Kogyo Seiyaku Co., Ltd.), ACCLAIM 2200, 3201, 4200, 6300, 8200 (manufactured by Lyondell). As examples of polyester diols, polyester diols obtained by reacting a polyhydric alcohol with a polybasic acid, and the like can be given.

Examples of the polyhydric alcohol include ethylene glycol, polyethylene glycol, propylene glycol, polypropylene glycol, tetramethylene glycol, polytetramethylene glycol, 1,6-hexanediol, neopentyl glycol, 1,4-cyclohexanedimethanol, 3-methyl-1,5-pentanediol, 1,9-nonanediol and 2-methyl-1,8-octanediol. Examples of the polybasic acids include phthalic acid, isophthalic acid, terephthalic acid, maleic acid, fumaric acid, adipic acid and sebasic acid.

Examples of commercially available products of the above polyester diols include Kurapol P-2010, P-1010, L-2010, L-1010, A-2010, A-1010, F-2020, F-1010, PMIPA-2000, PKA-A, PNOA-2010 and PNOA-1010 (manufactured by Kuraray Co., Ltd.).

Examples of polycarbonate polyols include polycarbonate of polytetrahydrofuran, poly(hexanediolcarbonate), poly(nonanediolcarbonate), poly(3-methyl-1,5-pentamethylenecarbonate).

Examples of commercially available products of the above polycarbonate diols include DN-980, DN-981, DN-982, DN-983 (manufactured by Nippon Polyurethane Industry Co., Ltd.), PMC-2000, PMC-1000, PNOC-2000, PNOC-1000 (manufactured by Kuraray Co., Ltd.), PLACCEL CD220, CD210, CD220PL, CD210PL, CD220HL, CD210HL (manufactured by Daicel Chemical Industries, Ltd.), PC-8000 (manufactured by PPG), PC-THF-CD (manufactured by BASF).

Examples of polycaprolactone diols are polycaprolactone diol obtained by reacting ε-caprolactone and a diol, where the diol is for example ethylene glycol, polyethylene glycol, propylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol.

Examples of commercially available products of these polycaprolactone diols include PLACCEL 240, 230, 230ST, 220, 220ST, 220NP1, 212, 210, 220N, 210N, L230AL, L220AL, L220PL, L220PM, L212AL (manufactured by Daicel Chemical Industries, Ltd.).

Examples of other polyols used as the component (A) include ethylene glycol, propylene glycol, 1,4-butanediol, 1,5-pentanediol, 1,6-hexanediol, neopentyl glycol, 1,4-cyclohexanedimethanol, hydrogenated bisphenol A, hydrogenated bisphenol F, dimethylol compound of dicyclopentadiene, tricyclodecanedimethanol, pentacyclopentadecanedimethanol, ring-opening polymer of β-methyl-δ-valerolactone, polybutadiene with terminal hydroxyl groups, hydrogenated polybutadiene with terminal hydroxyl groups, castor oil-modified diol, hydrogenated castor oil-modified polyol, terminal diol compound of polydimethylsiloxane, polydimethylsiloxanecarbitol-modified diol. In addition to the above polyols, diamines can be used in combination. Examples of diamines include ethylenediamine, tetramethylenediamine, hexamethylenediamine, p-phenylenediamine, 4,4'-diaminodiphenylmethane, diamines containing a heteroatom, polyether diamines.

The polystyrene-reduced number average molecular weight of the above polyols is preferably from 500 to 20,000, and still more preferably from 650 to 15,000.

Examples of the diisocyanate compounds of the component (B) include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanatethyl) fumarate, 6-isopropyl-1,3-phenylene diisocyanate, 4-diphenylpropane diisocyanate, hydrogenated diphenylmethane diisocyanate, hydrogenated xylylene diisocyanate, tetramethylxylylene diisocyanate, lysine isocyanate. These polyisocyanate compounds may be used either individually or in combinations of two or more.

Examples of the (meth)acrylates containing a hydroxyl group of the component (c) include 2-hydroxyethyl(meth)acrylate, 2-hydroxypropyl (meth)acrylate, 2-hydroxybutyl (meth)acrylate, 2-hydroxy-3-phenyloxypropyl(meth)acrylate, 1,4-butanediol mono(meth)acrylate, 2-hydroxyalkyl (meth)acryloyl phosphate, 4-hydroxycyclohexyl(meth) acrylate, 1,6-hexanediol mono(meth)acrylate, neopentyl glycol mono(meth)acrylate, trimethylolpropane di(meth)acrylate, trimethylolethane di(meth)acrylate, pentaerythritol tri(meth)acrylate, dipentaerythritol penta(meth)acrylate, and (meth)acrylate shown by the following formula (2) or (3):

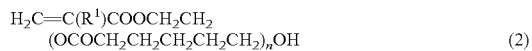

$$H_2C=C(R^1)COOCH_2CH_2(OCOCH_2CH_2CH_2CH_2CH_2)_nOH \quad (2)$$

$$H_2C=C(R^1)COOCH_2CH(OH)CH_2OC_6H_5 \quad (3)$$

wherein $R^1$ represents a hydrogen atom or a methyl group and n is an integer from 1 to 15.

Compounds produced by the addition reaction of (meth)acrylic acid and a compound containing a glycidyl group such as alkyl glycidyl ether, allyl glycidyl ether, and glycidyl (meth)acrylate can also be used. These hydroxyl group-containing (meth)acrylates may be used either individually or in combinations of two or more.

The proportion of the polyol (A), polyisocyanate compound (B), and (meth)acrylate containing a hydroxyl group (C) used for the preparation of the urethane (meth)acrylate (1) is preferably determined so that an isocyanate group included in the polyisocyanate compound and a hydroxyl group included in the (meth)acrylate containing a hydroxyl group are respectively 1.1 to 3 equivalents and 0.1 to 1.5 equivalents for one equivalent of a hydroxyl group included in the polyol.

In the reaction of these three components, a urethanization catalyst such as copper naphthenate, cobalt naphthenate, zinc naphthenate, di-n-butyltin dilaurate, triethylamine, and triethylenediamine-2-methyltriethyleneamine is usually used in an amount from 0.01 to 1 wt % of the total weight of the reactant. The reaction is carried out preferably at 10–90° C., and particularly preferably at 30–80° C.

The number average molecular weight of the urethane (meth)acrylate (1) used in the present invention is preferably from 100 to 40,000, and particularly preferably from 500 to 30,000. If the number average molecular weight of the urethane (meth)acrylate is less than 100, the Young's modulus of the resulting cured product tends to increase. If the number average molecular weight exceeds 40,000, viscosity of the composition may increase, thereby resulting in poor handling properties.

The proportion of the urethane (meth)acrylate to be added to the composition of the present invention is from 30 to 80 wt. % of the total weight of the components (1), (2), and (3). The proportion is preferably from 40 to 70 wt. % in order to ensure excellent applicability when applied to optical fibers, and superior flexibility and long-term reliability of the cured coating material. If the proportion of the component (1) is less than 30 wt. %, toughness of the resulting composition tends to decrease. If the proportion exceeds 80 wt. %, viscosity of the composition may increase, thereby resulting in poor handling properties.

2-Methyl-1-[4(methylthio)phenyl]-2-morpholino-propan-1-one shown by the above formula (1), which is used as the component (2) in the present invention, is commercially available as IRGACURE 907 (manufactured by Ciba Specialty Chemicals Co., Ltd.). The proportion of the component (2) is from 0.01 to 10 wt %, and preferably from 0.02 to 5 wt % of the total weight of the components (1), (2), and (3). If the proportion of the component (2) is less than 0.01 wt %, the resulting cured product may exhibit increased adhesion to substrates. If the proportion exceeds 10 wt %, the composition becomes yellowish, thereby impairing the appearance of the resulting optical fiber ribbons.

The component (3) of the present invention is a reactive diluent copolymerizable with the component (1), excluding the compound of the component (1). The component (3) is selected from polymerizable monofunctional vinyl monomers having one polymerizable vinyl group in the molecule and combinations of such polymerizable monofunctional vinyl monomers and polymerizable polyfunctional vinyl monomers having two or more polymerizable vinyl groups in the molecule.

Among the reactive diluents used as the component (3), specific examples of the polymerizable monofunctional vinyl monomers include vinyl monomers such as N-vinylpyrrolidone, N-vinylcaprolactam, vinylimidazole, and vinylpyridine; isobornyl (meth)acrylate, bornyl (meth)acrylate, tricyclodecanyl (meth)acrylate, dicyclopentanyl (meth)acrylate, dicyclopentenyl (meth)acrylate, and cyclohexyl (meth)acrylate; benzyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl(meth)acrylate, phenoxyethyl (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone(meth)acrylamide, isobutoxymethyl(meth)acrylamide, N,N-dimethyl (meth)acrylamide, t-octyl(meth)acrylamide, dimethylaminoethyl (meth)acrylate, diethylaminoethyl (meth)acrylate, 7-amino-3,7-dimethyloctyl (meth)acrylate, N,N-diethyl(meth)acrylamide, N,N-dimethylaminopropyl (meth)acrylamide, hydroxybutyl vinyl ether, lauryl vinyl ether, cetyl vinyl ether, 2-ethylhexyl vinyl ether, and acrylate monomers shown by the following formulas (4) to (6);

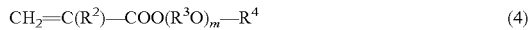

wherein $R^2$ represents a hydrogen atom or a methyl group, $R^3$ represents an alkylene group having 2–6, and preferably 2–4 carbon atoms, $R^4$ represents a hydrogen atom, an alkyl group having 1–12 carbon atoms, or an organic group having an aromatic ring, and m is an integer from 0 to 12, and preferably from 1 to 8;

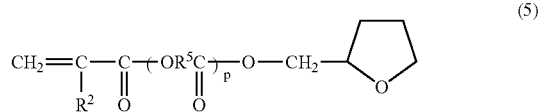

wherein $R^2$ is the same as defined above, $R^5$ represents an alkylene group having 2–8, and preferably 2–5 carbon atoms, and p is an integer from 1 to 8, and preferably from 1 to 4;

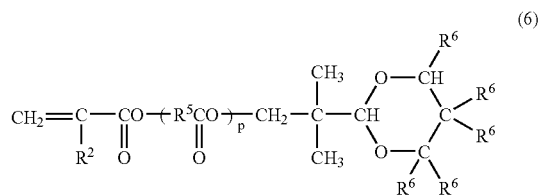

wherein $R^2$, $R^5$, and p are the same as defined above, and $R^6$ represents a hydrogen atom or a methyl group.

Examples of commercially available products of the above polymerizable monofunctional vinyl monomers are Aronix M-102, M-110, M-111, M-113, M-117 (manufactured by Toagosei Co., Ltd.), LA, IBXA, Viscoat#190, #192, #2000 (manufactured by Osaka Organic Chemical Industry Co., Ltd.), Light Acrylate EC-A, PO-A, NP-4EA, NP-8EA, M-600A, HOA-MPL (manufactured by Kyoeisha Chemical Co., Ltd.), KAYARAD TC110 S, R629, R644 (manufactured by Nippon Kayaku Co., Ltd). Examples of the polymerizable polyfunctional vinyl monomers include acrylate compounds such as trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris (2-hydroxyethyl)isocyanurate tri(meth)acrylate, tris(2-hydroxyethyl)isocyanurate di(meth)acrylate, bis (hydroxymethyl)tricyclodecane di(meth)acrylate, di(meth)acrylate of a diol which is an addion compound of ethylene oxide or propylene oxide to bisphenol A, di(meth)acrylate of a diol which is an addition compound of ethylene oxide or propylene oxide to hydrogenated bisphenol A, epoxy (meth)acrylate obtained by the addition of (meth)acrylic acid to a reaction product of diglycidyl ether and bisphenol A, diacrylate of polyoxyalkylene bisphenol A, and triethylene glycol divinyl ether.

Examples of commercially available products of the above polymerizable polyfunctional vinyl monomers include Yupimer UV SA1002, SA2007 (manufactured by Mitsubishi Chemical Corp.), Viscoat#195, #230, #215, #260, #335HP, #295, #300, #700 (manufactured by Osaka Organic Chemical Industry Co., Ltd.), Light Acrylate 4EG-A, 9EG-A, NP-A, DCP-A, BP-4EA, BP-4PA, PE-3A, PE-4A, DPE-6A (manufactured by Kyoeisha Chemical Co., Ltd.), KAYARAD R-604, DPCA-20,-30,-60,-120, HX-620, D-310, D-330 (manufactured by Nippon Kayaku Co., Ltd.), Aronix M-208, M-210, M-215, M-220, M-240, M-305, M-309, M-315, M-325 (manufactured by Toagosei Co., Ltd).

The proportion of these polymerizable diluents is preferably from 10 to 70 wt %, and particularly preferably from 15 to 50 wt % of the total weight of the resin composition. If the proportion exceeds 70 wt %, the resulting cured product may exhibit decreased toughness.

The weight ratio of the polymerizable monofunctional vinyl monomer to the polymerizable polyfunctional vinyl monomer included in the polymerizable diluent is 60–100%/40–0% by weight, and preferably 65–100%/35–0% by weight.

The liquid curable resin composition of the present invention is cured using heat or radiation. Radiation used herein includes infrared radiation, visible rays, ultraviolet rays, X-rays, electron beams, α-rays, β-rays, γ-rays.

A polymerization initiator may be added to the liquid curable resin composition of the present invention. As the polymerization initiator, a heat polymerization initiator or a photopolymerization initiator can be used.

When the liquid curable resin composition of the present invention is cured using heat, a heat polymerization initiator such as peroxides or azo compounds is used. Specific examples include benzoyl peroxide, t-butyl-oxybenzoate and isisobutylonitrile.

When the liquid curable resin composition of the present invention is cured using radiation, a photopolymerization initiator is used. In addition, a photosensitizer is added as required. Given as examples of the photopolymerization initiator are 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2,4,6-trimethylbenzoyidiphenylphosphine oxide, bis-(2,6-dimethoxybenzoyl)-2,4,4-trimethylpentylphosphine oxide and bis-(2,6-dimethoxybenzoyl)-phenylphosphine oxide.

Examples of commercially available products of the photopolymerization initiator are Irgacure 184, 369, 651, 500, 1700, 1750, 1850, 819, CG24-61, Darocure 1116, 1173 (manufactured by Ciba Specialty Chemicals Co., Ltd.), Lucirin TPO, LR8728 (manufactured by BASF) and Ubecryl P36 (manufactured by UCB).

Examples of the photosensitizer are triethylamine, diethylamine, N-methyidiethanolamine, ethanolamine, 4-dimethylaminobenzoic acid, methyl 4-dimethylaminobenzoate, ethyl 4-dimethylaminobenzoate and isoamyl 4-dimethylaminobenzoate. Examples of commercially available products of the photosensitizer are Ubecryl P102, 103, 104 and 105 (manufactured by UCB).

When curing the liquid curable resin composition of the present invention using both heat and radiation, the above heat polymerization initiator and photopolymerization initiator may be used in combination. The proportion of the polymerization initiator to be added to the composition is preferably 0.1–10 parts by weight, and particularly preferably 0.5–7 parts by weight for 100 parts by weight of the components (1), (2), and (3).

In addition to the above components, other curable oligomers or polymers may be added to the liquid curable resin composition of the present invention insofar as the characteristics of the liquid curable resin composition are not adversely affected.

Examples of such other curable oligomers or polymers include polyester (meth)acrylate, epoxy (meth)acrylate, polyamide (meth)acrylate, siloxane polymer having a (meth)acryloyloxy group, reactive polymers obtained by reacting (meth)acrylic acid with a copolymer of glycidyl methacrylate and other polymerizable monomers.

Amines may be added to the liquid curable resin composition of the present invention to prevent generation of hydrogen gas which causes transmission loss in the optical fibers. Examples of such amines are diallylamine, diisopropylamine, diethylamine, diethylhexylamine.

In addition to the above components, additives such as antioxidants, UV absorbers, light stabilizers, silane coupling agents, coating surface improvers, heat polymerization inhibitors, leveling agents, surfactants, colorants, preservatives, plasticizers, lubricants, solvents, fillers, aging preventives, and wettability improvers can be added to the liquid curable resin composition of the present invention, as required. Examples of antioxidants are Irganox 1010, 1035, 1076, 1222, 1520 (manufactured by Ciba Specialty Chemicals Co., Ltd), Antigene P, 3C, FR, GA-80 (manufactured by Sumitomo Chemical Industries Co., Ltd.). Examples of UV absorbers include Tinuvin P, 234, 320, 326, 327, 328, 329, 213 (manufactured by Ciba Specialty Chemicals Co., Ltd.), Seesorb 102, 103, 110, 501, 202, 712, 704 (manufactured by Shipro Kasei Kaisha, Ltd.). Examples of light stabilizers are Tinuvin 292, 144, 622LD (manufactured by Ciba Specialty Chemicals Co., Ltd.), Sanol LS770 (manufactured by Sankyo Co., Ltd.) and Sumisorb TM-061 (manufactured by Sumitomo Chemical Industries Co., Ltd. Examples of silane coupling agents are γ-aminopropyltriethoxysilane, γ-mercaptopropyltrimethoxysilane, and γ-methacryloxypropyltrimethoxysilane, and commercially available products such as SH6062, SH6030 (manufactured by Toray-Dow Corning Silicone Co. Ltd.), KBE 903, 603, and 403 (manufactured by Shin-Etsu Chemical Co., Ltd.). Examples of coating surface improvers are silicone additives such as dimethyl siloxane polyether, and commercially available products such as DC-57, DC-190 (manufactured by Dow Corning), SH-28PA, SH-29PA, SH-30PA, SH-190 (manufactured by Toray-Dow Corning Silicone Co., Ud.), KF351, KF352, KF353, KF354 (manufactured by Shin-Etsu Chemical Co., Ltd.), L-700, L-7002, L-7500, FK-024-90 (manufactured by Nippon Unicar Co., Ltd.).

As indicated above optical fibers are usually color coded. Optical fiber color coding can be based on colored coating compositions using up to 12 or more colors. Although optical fiber inks were originally solvent-based or thermosetting inks, in more recent times, radiation-curable inks have been used to increase the speed of the inking process. In these ink compositions, pigment is dispersed in a radiation-curable carrier or base composition.

While the ink composition must have a fast cure speed to ensure complete cure of the ink coating on the high speed drawing/coloring lines, the increase in cure speed should not come at the expense of other important properties of the ink coating, such as that providing suitable break-out performance. Break-out performance is the ability of the cured ink coating to separate from the matrix material without separating the ink layer from the secondary coating, to provide an easy access to the individual coated optical glass fibers contained within the ribbon assembly, for instance during cabling/connection operations of the optical fibers.

Therefore, a radiation-curable ink composition should preferably exhibit adaptable adhesion properties to provide an adhesion between the secondary coating and the ink coating that is greater than the adhesion between the ink coating and the matrix material to provide easy fiber access.

Preferably, radiation curable ink compositions comprise components (1), (2) and (3) as described above if the composition is suitably formulated. Typically the ink coating composition of the present invention comprises: (1) at least one oligomer, (2) at least one photoinitiator, (3) at least one reactive diluent, (4) a pigment, and (5) optionally additives, wherein the component (2) comprises at least about 0.05 wt. % of a photoinitiator as represented by formula (1). Preferably the component (2) comprises at least 0.1% of a photoinitiator as represented by formula (1). More preferably the component (2) comprises at least 0.2% of a photoinitiator as represented by formula (1). Most preferably the component (2) comprises at least 0.5% of a photoinitiator as represented by formula (1).

The ink compositions comprise two functional components: a pigment system which functions to impart color and a radiation-curable carrier system which functions to allow the pigment system into a coherent, high-quality film after radiation-cure. Typically, a carrier system will be mixed with a pigment system to form the radiation-curable ink.

Radiation-curable carrier systems which are suitable for forming the present ink composition contain one or more radiation-curable oligomers and monomers having at least one functional group capable of polymerization when exposed to actinic radiation. Suitable radiation-curable oligomers or monomers are now well known and within the skill of the art.

A preferred ink composition can be formulated from a composition containing: from about 1 to about 80 weight % of at least one radiation-curable oligomer (1); from about 1 to about 20 weight % of a photoinitiator (2); from about 1 to about 80 weight % of at least one radiation-curable diluent monomer (3) and from about 1 to about 20 weight % of at least one pigment which absorbs light of a visible wavelength (4) based on the total weight % of the ink composition. Preferred amounts of the photoinitiator are from about 1.5 to about 20 weight %, more preferably from about 2 to about 15 weight %.

Preferred amounts of the radiation-curable oligomer (1) include from about 10 to about 70% by weight, more preferably, about 20 to about 60% by weight, based on the total weight of the ink composition.

The colored coating compositions of the present invention preferably are cured with sufficient energy to have less than 15% unreacted acrylate. Suitable irradiation energy values are 0.05–2 $J/cm^2$, preferably 0.1–1.5 $J/cm^2$. More in particular, values below 0.5 $J/cm^2$ are particular preferred.

The present invention further relates to a two-layer film produced by applying the liquid curable resin composition of any one of claims 1–4 to a cured film of a radiation-curable resin comprising the compound shown by the above formula (1), and curing the composition. Preferably, the cured film of the radiation-curable resin comprising the compound shown by the above formula (1) is a colored coating or ink composition.

The present invention further relates to a method for preparing a two-layer film having a T-peel strength of about 1.8 g/cm or less which comprises the steps of:

(i) applying a radiation-curable resin comprising the compound shown by the above formula (1) onto a glass plate using a bar coater to a thickness of 50 μm, (ii) curing the applied resin by irradiating with ultraviolet rays at a dose of 0.20 J/cm$^2$ in a nitrogen atmosphere, (iii) subsequently applying thereon the liquid curable resin composition comprising components (1), (2) and (3) as defined in any one of claims 1–4 by using an applicator bar to a thickness of 50 μm, and (iv) curing said composition by irradiating with ultraviolet rays at a dose of 0.20 J/cm$^2$ in air.

The liquid curable resin composition comprising components (1), (2) and (3) as defined above, can be used as a ribbon matrix material or a bundling material.

The present invention further relates to a ribbon matrix material according to claim 7, to a ribbon bundling material, according to claim 8, and to an optical glass fiber assembly, according to claim 9. Preferably, the cured film of the radiation curable resin comprising the compound shown by formula (1) is colored.

The viscosity of the liquid curable resin composition of the present invention is preferably from 200 to 20,000 mPa·s/25° C., and particularly preferably from 2,000 to 15,000 mPa·s/25° C.

The Young's modulus at 23° C. of the cured product obtained by curing the liquid curable resin composition of the present invention using radiation or heat is preferably from 40 to 150 kg/mm$^2$, and particularly preferably from 50 to 120 kg/mm$^2$.

The liquid curable compositions of the present invention may be formulated such that the composition after cure has a modulus as low as 0.1 MPa and as high as 2,000 MPa or more. Suitable compositions for ribbon matrix materials and bundling materials (all of which can be colored or not) and ink compositions generally have a modulus of above 50 MPa, with matrix materials tending to have a modulus more particularly between about 50 MPa to about 200 MPa for soft ribbon matrix materials, and between 200 to about 1500 MPa for hard ribbon matrix materials.

Elongation and tensile strength of these materials can also be optimized depending on the design criteria for a particular use. For cured coatings formed from radiation-curable compositions formulated for use as ribbon matrix material, bundling material or radiation curable ink on optical fibers, the elongation-at-break is typically between 6% and 100%, and preferably higher than 10%. The tensile strength of these materials preferably is between 10 and 100 MPa, more preferred between 20 and 60 MPa, particularly preferred between 25 and 50 MPa.

The glass transition temperature (Tg), measured as the peak tan-delta determined by dynamic mechanical analysis (DMA), can be optimized depending on the particulars of the application. The glass transition temperature may be from 10° C. to 150° C. or higher, more preferably above 30° C., for compositions designed for use as ribbon matrix material, bundling material or radiation curable ink. The ink coating generally has a Tg of at least about 30° C., more preferably at least about 50° C.

The stress at the time of peeling a two-layer film, obtained by applying the composition of the present invention to a cured film of a radiation-curable resin comprising the compound shown by the above formula (1), preferably a colored coating composition, and curing the composition, in a T-peel strength test is about 1.8 g/cm or less, preferably about 1.5 g/cm or less, and particularly preferably about 1.3 g/cm or less. These values are obtained according to a measuring method (JIS K6854) for T-peel strength as further described in the test examples.

The relative cure rates for ultraviolet cured coatings can be determined using FTIR transmission techniques. The method is applicable to coating systems that cure by loss of double bonds, in particular acrylate double bonds, when exposed to ultraviolet light.

The method used to measure the cure speed by the percentage reacted acrylate unsaturation (% RAU) is the cure speed FTIR test as described in WO 98/50317, which is incorporated herein by reference.

Preferably, the % RAU (percentage reacted acrylate unsaturation) of the cured resin compositions of the present invention is at least 75%, more preferably at least about 80%, particularly preferred at least about 90%, and most preferably at least about 95%, when cured in the presence of air. The average % RAU should be based on the % RAU of at least four different resin compositions The cure speed can alternatively be determined by calculating the ratio of the Young's modulus (as described below in the test examples section) of a composition cured at 0.1 J/cm$^2$ and one cured at 1 J/cm$^2$ under air, each film of the composition having a thickness of 200 micron.

EXAMPLES

The present invention will be explained in more detail by examples, which are not intended to be limiting of the present invention.

Synthesis of Resin Composition 1 and 1a

A reaction vessel equipped with a stirrer was charged with 14.5 wt % of tolylene diisocyanate, 11.3 wt % of tricyclodecanedimethanol diacrylate ("SA1002" manufactured by Mitsubishi Chemical Corp.), 0.04 wt % of di-n-butyltin dilaurate, and 0.02 wt % of 2,6-di-t-butyl-p-cresol. The mixture was then cooled to between 5 and 10° C. 12.7 wt % of 2-hydroxyethyl acrylate was added dropwise at a temperature of 10° C. or lower while stirring. After the addition, the mixture was allowed to react at 30° C. for one hour. After the addition of 7.0 wt % of ethylene oxide (1 mol) addition diol of bisphenol A (DA400 manufactured by Nippon Oil and Fats Co., Ltd.) and 22.5 wt % of polytetramethylene glycol with a number average molecular weight of 2,000, the mixture was reacted at between 50 and 70° C. for two hours. The reaction was terminated when the residual isocyanate content was 0.1 wt % or less.

4.9 wt % of tricyclodecanedimethanol diacrylate ("SA1002#" manufactured by Mitsubishi Chemical Corp.), 8.9 wt % of N-vinylpyrrolidone (manufactured by ISP Japan Ltd.), 7.7 wt % of isobornyl acrylate ("IBOA" manufactured by Osaka Organic Chemical Industry Co., Ltd.), 7.0 wt % of acrylate of ethylene oxide (1 mol) addition diol of bisphenol A ("Viscoat 700" manufactured by Osaka Organic Chemical Industry Co., Ltd.), 2.9 wt % of Irgacure 184 (manufactured by Ciba Specialty Chemicals Co., Ltd.), and 2.9 wt % of Irganox 1035 (manufactured by Ciba Specialty Chemicals Co., Ltd.) were added to the resulting mixture at 70° C. while stirring, to obtain a homogeneous solution. The resulting solution was referred to as a resin composition 1. Then, after the addition of 0.5 wt % of Irgacure 907 to this resin composition, the mixture was stirred at 50° C. until the mixture became a homogeneous solution, to obtain a resin composition 1a.

Synthesis of Resin Composition 2, 2a, and 2b

A reaction vessel equipped with a stirrer was charged with 18.4 wt % of tolylene diisocyanate, 10.9 wt % of isobornyl acrylate "IBOA" manufactured by Osaka Organic Chemical Industry Co., Ltd.), 0.05 wt % of di-n-butyltin dilaurate, and 0.02 wt % of 2,6-di-t-butyl-p-cresol. The mixture was cooled to between 5 and 10° C. 17.4 wt % of 2-hydroxyethyl acrylate was then added dropwise at a temperature of 10° C. or lower while stirring. After the addition, the mixture was allowed to react at 30° C. for one hour. After the addition of 30.6 wt % of polytetramethylene glycol with a number average molecular weight of 1,000, the mixture was allowed to react at between 50 and 70° C. for two hours. The reaction was terminated when the residual isocyanate content was 0.1 wt % or less.

4.8 wt % of N-vinylpyrrolidone (manufactured by ISP Japan Ltd.), 14.5 wt % of trimethylolpropane triacrylate ("Viscoat 295" manufactured by Osaka Organic Chemical Industry Co., Ltd.), 2.9 wt % of Irgacure 184 (manufactured by Ciba Specialty Chemicals Co., Ltd.), and 2.9 wt % of Irganox 1035 (manufactured by Ciba Specialty Chemicals Co., Ltd.) were added to the resulting mixture while stirring at 70° C. to obtain a homogeneous solution. The resulting solution was referred to as a resin composition 2. After the addition of 0.5 wt % of Irgacure 907 to this resin composition, the mixture was then stirred at 50° C. until the mixture became a homogeneous solution, to obtain a resin composition 2a. Moreover, 1.0 wt % of Irgacure 907 was added to the resin composition 2 to obtain a resin composition 2b.

Test Examples

The liquid curable resin compositions obtained in the above Examples were cured according to the following method to prepare test specimens. The test specimens were evaluated as follows. The results are shown in Table 1 and 2.

1. Measurement of Young's Modulus

The liquid curable resin compositions were applied to a glass plate using an applicator bar for the preparation of films with a 250 μm thickness. The applied compositions were irradiated with ultraviolet rays at a dose of 1 J/cm² in air. The cured products were allowed to stand at a temperature of 23° C. and a relative humidity of 50% for 12 hours or more to prepare test specimens. The Young's modulus of the test specimens at 23° C. was measured according to JIS K7113. Note that the Young's modulus was calculated from the tensile stress at 2.5% distortion with a tensile rate of 1 mm/min.

2. Measurement of Adhesion to Radiation-Curable Resin Film (T-Peel Strength)

A radiation-curable resin composition, having a composition shown in Table 1 was applied to a glass plate using a bar coater to a thickness of 50 μm. The applied resin was then irradiated with ultraviolet rays at a dose of 0.20 J/cm² in a nitrogen atmosphere. The resin composition of the present invention was then applied to the cured Radiation curable resin using an applicator bar to a thickness of 50 μm and irradiated with ultraviolet rays at a dose of 0.20 J/cm² in air. The two-layer cured film was cut into a strip with a width of 2 cm and subjected to the 180 peel test (JIS K6854) at a tensile rate of 100 mm/min. to measure the adhesion of the film obtained from the resin composition of the present invention to the radiation curable resin.

TABLE 1

|  | radiation curable resin (wt %) |
| --- | --- |
| Bisphenol A diglycidyl diacrylate[1] | 57 |
| Neopentyl glycol hydroxypivalate diacrylate[2] | 17 |
| Bisphenol A ethylene glycol diurethane acrytate[3] | 17 |
| Polydimethylsiloxanemonoalcohol acrylate[4] | 3 |
| Irgacure 907 | 6 |

[1]Yupimer UV EPOC manufactured by Mitsubishi Chemical Corp.
[2]Kayarad MANDA manufactured by Nippon Kayaku Co., Ltd.
[3]Urethane acrylate obtained by reacting DA1500 (manufactured by Nippon Oil and Fats Co., Ltd.), 2,4-tolylene diisocyanate, and 2-hydroxyethyl acrylate (molar ratio: 1:2:2)
[4]Ebecryl 350 manufactured by Daicel-UCB Co., Ltd.

1) Yupimer UV EPOC manufactured by Mitsubishi Chemical Corp.
2) Kayarad MANDA manufactured by Nippon Kayaku Co., Ltd.
3) Urethane acrylate obtained by reacting DA 1500 (manufactured by Nippon Oil and Fats Co., Ltd.) 2,1 tolylene diisocyanate, and 2 hydroxyethyl acrylate (molar ratio: 1:2:2)
4) Ebecryl 350 manufactured by Daicel-UCB Co., LTD.

The results are shown in Table 2. In addition, the T-peel strength in the case of irradiating the composition with ultraviolet rays at a dose of 0.40 J/cm² in air was shown in Table 2 as reference.

TABLE 2

| Composition | | Example | | | Comparative Example | |
| --- | --- | --- | --- | --- | --- | --- |
|  |  | 1a | 2a | 2b | 1 | 2 |
| Young's modulus (kg/mm²) | | 93 | 82 | 84 | 95 | 81 |
| T-peel strength (g/cm) | UV dose (0.20 J/cm²) | 1.2 | 1.0 | 0.9 | 2.2 | 2.8 |
|  | UV dose (0.40 J/cm²) | 1.3 | 1.2 | 1.0 | 2.6 | 3.5 |

The liquid curable resin composition of the present invention exhibits low adhesion to the ink layer as a substrate and is therefore suitable for the ribbon matrix material for optical fiber ribbons.

The peelability of the matrix material from the ink composition was judged. The cured films were cut into with a knife in order to evaluate whether a good breakout was obtained or not. The adhesion strength of the cured ink coating and release from the matrix material were measured using the so-called "sandwich test" or "ink adhesion test". In said test, the ink composition is applied to a secondary coating, and on top of the ink composition a matrix material was applied ("sandwich" of ink composition in between secondary coating and matrix material). The matrix was cut into with a knife and was peeled back. The peelability of the matrix material from the ink layer was evaluated by observation of the samples using the naked eye and touching the samples with the finger to examine the presence or absence of residues of the matrix on the ink layer. If neither observation confirmed any residues remaining on the ink coating when pulling away the matrix/ribbon material, the peelability was judged as good; if the presence of the matrix was confirmed or if the ink layer remained to the matrix, the peelability was judged as bad. Break-out/peelability of the matrix materials was judged to be good in the test examples 1a, 2a and 2b.

The invention claimed is:

1. A two-layer film comprising a first layer of a radiation-cured resin composition, and a second layer of a radiation-cured resin composition which is applied onto the first layer, wherein
the cured resin composition of each of the first and second layers comprises (1) 30–80 wt % of one or more oligomers wherein at least one oligomer is a urethane (meth)acrvlate oligomer: (2) 0.01–10 wt % of a photoinitiator, and (3) 10–70 wt % of one or more polymerizable diluents comprising a polymerizable monofunctional and/or polyfunctional vinyl monomer, wherein the wt % of components (1), (2) and (3) are relative to the combined weight of the components (1), (2) and (3); wherein
the photoinitiator (2) of the first layer consists solely of 2-methyl-i-[4-methylthiophenyl]-2-morpholino-propan-1-one; and wherein
the photoinitiator (2) of the second layer consists of 2-methyl-i-[4-methylthiophenyl]2-morpholino-propan-1-one, and at least one other photoinitiator selected from the group consisting of 1-hydoxycyclohexy phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Micheler's ketone, benzoin propyl ether, benzoin ethyl ether, benzyl methyl ketal, 1-(4-isopropylphenyl)-2-hydroxy-2-methylpropan-1-one, 2-hydroxy-2-methyl-1-phenyl-propan-1-one, thioxanthone, diethylthioxanthone, 2-isopropylthioxanthone, 2-chlorothioxanthone, 2,4,6-trimethylbenzoyldiphenylphosphine oxide, and bis-(2,6-dimethoxybenzoyl)~2,4,4-trimethylpentylphosphine oxide; and wherein
the second layer is separable from the first layer and exhibits a T-peel strength of about 1.8 g/cm or less.

2. Two-layer film according to claim 1, wherein at least one of the first and second layers of radiation-cured resin composition is a colored coating or ink composition.

3. A method for preparing a two-layer film having a T-peel strength of about 1.8 g/cm or less which comprises the steps of:
(i) applying a first liauid radiation-curable resin composition to a thickness of 50 μm. the first radiation-curable resin composition comprised of,
(1) at least one urethane (meth)acrylate oligomer,
(2a photoinitiator which consists of 2-methyl-1-[4-methylthiophenyl]-2-morpholino-propan-1-one, and at least one other photoinitiator selected from the group consisting of 1-hydroxycyclohexy phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4.4'-dimethoxybenzophenone, 4,4'-diaminobenzophenone, Micheler's ketone, benzoin propy ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2,4,6- trimethylbenzoyldiphenylphosphine oxide, and bis-(2,6-dimethoxybenzoyl ~2,4,4-trimethylpentylphosphine oxide, and
(3) one or more polymerizable diluents comprising a polymerizable monofunctional and/or polyfunctional vinyl monomer,
(ii) curing the applied first liquid radiation-curable resin by irradiating with ultraviolet rays at a dose of 0.20 J/cm$^2$ in a nitrogen atmosphere to form a first radiation-cured layer,
(iii) subsequently applying onto the first radiation-cured layer a second liquid radiation-curable resin composition to a thickness of 50μm. the second radiation-curable resin composition comprised of,
(1) at least one urethane (meth)acrylate oligomer,
(2) a photoinitiator which consists solely of 2-methyl-1-[4-methylthiophenyl]-2-morpholino-propan-1-one, and
(3) one or more polymerizable diluents comprising a polymerizable monofunctional and/or polyfunctional vinyl monomer, and thereafter
(iv) curing said second liquid radiation-curable composition by irradiating with ultraviolet rays at a dose of 0.20 J/cm$^2$ in air to form a second radiation-cured layer on the first radiation cured layer.

4. Ribbon matrix material comprising the two-layer film as in claim 1.

5. Ribbon bundling material comprising the two-layer film as in claim 1.

6. Optical glass fiber ribbon assembly comprising at least two coated optical glass fibers encompassed by a ribbon matrix material, wherein
each of the coated optical glass fibers comprise an optical glass fiber having a radiation-cured film of a radiation-curable optical fiber coating resin composition comprising (1) 30–80 wt % of one or more oligomers wherein at least one oligomer is a urethane (meth)acrylate oligomer; (2) 0.01–10 wt % of a photoinitiator, and (3) 10–70 wt % of one or more polymerizable diluents comprising a polymerizable monofunctional and/or polyfunctional vinyl monomer, wherein the wt % of components (1), (2) and (3) are relative to the combined weight of the components (1), (2) and (3); and wherein the photoinitiator (2) of the radiation-curable optical fiber coating resin composition consists of 2-methyl-1-[4-methylthiophenyl]-2-morpholino-propan-1-one, and at least one other photoinitiator selected from the group consisting of 1-hydroxycyclohexy phenyl ketone, 2,2-dimethoxy-2-phenylacetophenone, xanthone, fluorenone, benzaldehyde, fluorene, anthraquinone, trirhenylamine, carbazole, 3-methylacetophenone, 4-chlorobenzophenone, 4,4'-dimethoxybenzophenone, 4,4'-diaminobenzophenone, Micheler's ketone, benzoin propyl ether, benzoin ethyl ether, benzyl methyl ketal, 1-(4-isopropylphenyl)-2-hydroxy-2-methylpropan-1-one, 2-hydroxy-2-methyl-1-phenyl-propan-1-one, thioxanthone, diethylthioxanthone, 2-isopropylthioxanthone, 2-chlorothioxanthone, 2,4,6-trimethylbenzoyldiphenylphosphine oxide, and bis-(2,6-dimethoxybenzoyl)~2,4,4-trimethylpentylphosphine oxide, and wherein
the ribbon matrix material which encompasses said coated optical glass fibers to form said optical glass fiber ribbon assembly is comprised of a radiation-cured film of a radiation-curable ribbon matrix resin composition comprising components (1), (2), and (3) as defined above but wherein the photoinitiator (1), (2), and (3) as defined above but wherein the photoinitiator (2) of the radiation-curable ribbon matrix resin composition consists solely of 2-methyl-1-[4-methylthiophenyl]-2-morpholino-propan-1-one.

7. Optical glass fiber ribbon assembly according to claim 6, wherein the radiation-cured film of the radiation-curable optical fiber coating resin composition is colored.

8. Two-layer film of claim 1 having a T-peel strength of about 1.8 g/cm or less.

9. Two-layer film of claim 8, wherein the T-peel strength is about 1.5 g/cm or less.

10. Two-layer film of claim 8, wherein 2-methyl-1-[4-methylthiophenyl]-2-morpholino-propan-1-one is present in at least one of the first and second layers in an amount of about 2 wt % or more.

* * * * *